United States Patent [19]
Biber

[11] 3,810,212
[45] May 7, 1974

[54] PREFERENTIAL POWER DISTRIBUTION SYSTEM FOR BATTERY POWERED CAMERA HAVING ELECTRONIC FLASH UNIT

[75] Inventor: Conrad H. Biber, Needham, Mass.

[73] Assignee: Polaroid Corporation, Cambridge, Mass.

[22] Filed: Jan. 2, 1973

[21] Appl. No.: 320,602

[52] U.S. Cl. .................. 354/128, 95/11 L, 240/1.3, 242/71, 315/241 P
[51] Int. Cl. .......................................... G03b 15/05
[58] Field of Search.......... 95/31 EL, 11 L; 240/1.3; 242/71.5, 71; 315/100 S, DIG. 5, 241 P

[56] References Cited
UNITED STATES PATENTS
3,296,949  1/1967  Bounds ........................ 95/31 EL
3,460,891  8/1969  Bley et al. .................... 95/31 EL Primary Examiner—Robert P. Greiner

[57] ABSTRACT

A preferential power distribution system for a battery powered camera having an electronic exposure control system, a film transport motor, and an electronic flash unit, in which recharging of the flash unit is controlled by a circuit which responds to the voltage of the battery to inhibit recharging when the battery voltage is low.

15 Claims, 4 Drawing Figures

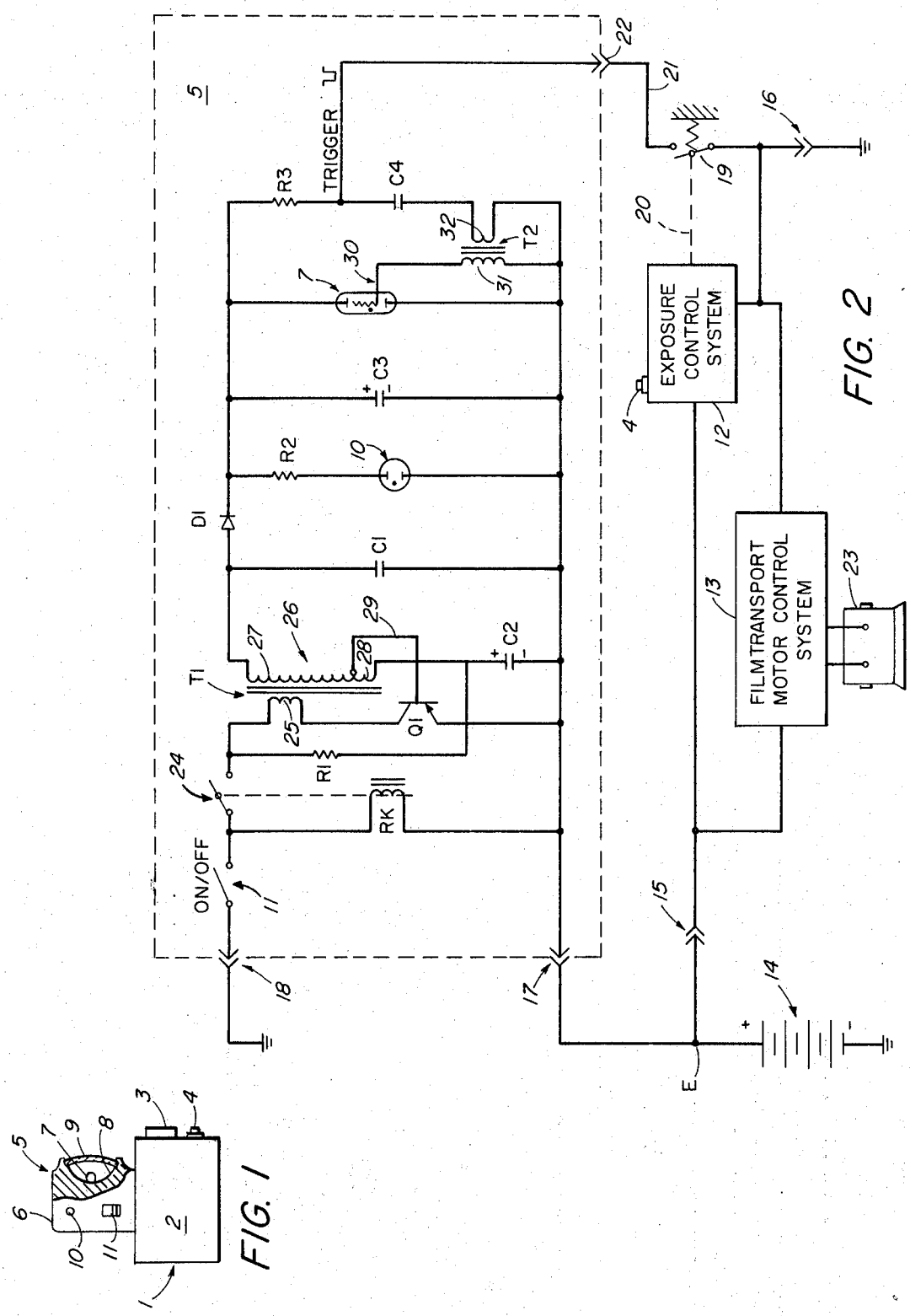

PREFERENTIAL POWER DISTRIBUTION SYSTEM FOR BATTERY POWERED CAMERA HAVING ELECTRONIC FLASH UNIT

This invention relates to photography, and particularly to a novel preferential power distribution system for a battery powered camera including an electronic flash unit.

The art of photography has advanced in the direction of progressively more automatic camera operation. Cameras are now available with which, at the touch of a button, the proper exposure is automatically computed and made upon a film unit, and the exposed film unit is then processed to deliver a finished print to the photographer immediately thereafter. Such cameras are disclosed, for example, in U.S. Pat. No. 3,641,889 to Vaito K. Eloranta, issued on Feb. 15, 1972 for Exposure Control System, in copending application for U.S. Pat. Ser. No. 655,850, filed on July 25, 1967 by Edwin H. Land and A. H. Bellows for Folding Camera and assigned to the assignee of this application, in copending U.S. application for Letters Patent Ser. No. 25,567, filed on Apr. 15, 1970 by Edwin H. Land for Reflex Camera and assigned to the assignee of this application, and in copending U.S. application for Letters Patent Ser. No. 308,679, filed on Nov. 22, 1972 by Edwin H. Land for Electronic Photographic System and assigned to the assignee of this application.

All of the various operating elements of an automatic camera system are preferably electrically powered and electronically controlled. Power for this purpose can be provided in various conventional ways, but most convenient for the photographer is to take the power from a battery of batteries carried about with the camera. As pointed out in the above-cited U.S. application Ser. No. 308,679, such a battery may be supplied in a cassette with a supply of film units for exposure in the camera.

In whatever form provided, the battery will have a useful life that depends on the manner in which it is used, and the conditions of temperature and humidity in which it is used. During this useful service life, the potential of the battery will gradually fall, until a value is reached below which the battery cannot accomplish its intended functions. In addition, during use within the useful life of the battery, the voltage produced will drop when current is drawn from the battery, at a rate and to a value that depend on the amplitude of the current drawn, and will then recover after the load is removed, usually to some potential below the potential before use.

The battery may be required to perform a number of camera functions, including electronic shutter control, automatic exposure control, film transport and electronic flash recharging. Of these functions, the major demands are made by the film transport motor and by the electronic flash unit, with the latter typically being an order of magnitude greater than the former. At some time during the life of the battery, it will become unable to perform all of these functions.

If the electronic flash unit has its own battery, failure of that battery will be immediately apparent to the user, because his ready light will not go on. That will indicate the need for replacement or recharging. However, when one battery is required to perform several functions, it may not be apparent to the user that it needs to be recharged or replaced until the matter is brought to his attention by the failure of the camera to carry out a complete operating cycle.

Particularly for self-processing cameras of the kind referred to in the above-cited patent and applications, the most undesirable type of failure of this kind would be failure of the film transport motor to properly move a film unit through the processing rolls and out for removal by the user. One object of the invention is to greatly reduce the probability that such a failure will occur. Another object is to provide an indication to the user of an automatic camera including an electronic flash unit that the battery is below par.

Briefly, the above and other objects of the invention are obtained by the combination with a camera having a film transport motor and an electronic flash unit of a recharging circuit for the flash unit which includes a battery condition responsive control circuit. The control circuit inhibits the recharging of the flash unit when the battery potential has fallen to a voltage below which it cannot be assumed capable of powering both the electronic flash and the film transport motor, as well as other electronic components that may be provided in the camera. The control circuit continues to prevent the recharging of the strobe circuit until the battery voltage again rises to a value, preferably above the value at which recharging was stopped, which indicates that the battery has recovered enough so that it can perform all the functions desired. During the interval in which the strobe unit is not recharged, failure of the ready light to be illuminated indicates to the photographer that the battery is low and may serve as a signal that the battery should be recharged or replaced, at a time when the battery still has sufficient residual capacity to operate the film transport mechanism and exposure control system.

The invention thus makes it possible to make use of the ready lamp conventionally provided with a strobe unit to indicate the condition of a multiple purpose power supply and indicate that the battery is approaching failure even before it reaches the level of exhaustion in which it cannot perform the film transport function. Since the strobe unit is the major power consumer in systems of this kind, disabling it leaves the battery with a very substantial capacity to perform its other assigned functions.

The provision of hysteresis in the control circuit, by reason of which the charging of the strobe unit is interrupted when the battery voltage falls to a first value, and is not allowed to resume until the battery has reached a second value higher than the first value, is a significant advantage of the apparatus of the invention. This hysteresis permits the battery to recover substantially above the drop out potential, and prevents chattering about the drop out potential. Such chattering would both inhibit the recovery of the battery, and unduly prolong the recharging time of the strobe unit.

The manner in which the apparatus of the invention is constructed, and its mode of operation, will best be understood in the light of the following detailed description, together with the accompanying drawings of various illustrative embodiments thereof.

In the drawings,

FIG. 1 is a schematic elevational view, with parts shown in cross section and parts broken away, of a camera incorporating a strobe unit in accordance with the invention;

FIG. 2 is a schematic block and wiring diagram of one embodiment of the photographic system of the invention, incorporating a strobe unit and a control circuit therefor in accordance with the invention;

Figure 4:
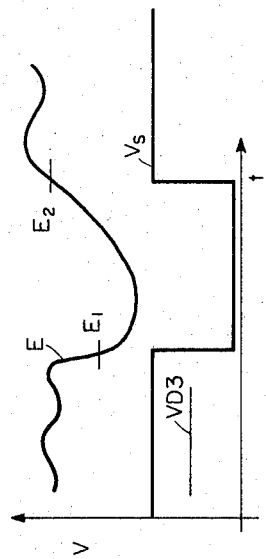
FIG. 4 is a schematic graph of voltage vs. time illustrating the operation of the apparatus of FIG. 3.

FIG. 1 schematically illustrates a camera generally designated 1 and comprising a housing 2, which may be of either fixed or folding construction, on which there are mounted a lens and shutter 3 and a shutter pushbutton 4. The pushbutton 4 may be a conventional mechanical actuator, or, as in the Polaroid SX-70 Land Camera, for example, it may be a spring-returned, manually actuated electrical pushbutton switch.

Mounted on the housing 2 of the camera 1 is an electronic flash unit generally designated 5 and comprising a housing 6. A light emitting gas discharge tube 7 is mounted in a reflector 8 formed in the housing. The lamp 7 produces a flash of light at times to be described. This light flash is formed into a beam that is focused on the region seen by the camera through a lens 9 of conventional construction. A conventional ready lamp 10, which may be a voltage responsive gas discharge tube, such as a neon glow lamp or the like, is visible in one side of the housing 6 of the strobe unit 5. An on-off switch 11 is provided in the housing 6 in a position where it can be readily manipulated by the operator of the camera.

The strobe unit 5 may be detachably mounted on the camera 1 by means of a suitable electrical connector, or, if desired, it may be formed integral with the camera 1.

FIG. 2 shows the pertinent electrical details of a photographic system comprising the camera 1 and the strobe unit 5. Broadly, the system comprises the strobe unit 5, an exposure control system shown in block form at 12, a film transport motor control system 13, and a battery schematically shown at 14 which supplies power for the system. The battery 14 may be mounted in the strobe unit 5, in the camera housing 2, or, preferably, included in a cassette with a set of film units for use in the camera, so that a fresh battery can be made available for each supply of film, in the manner and for the purposes described in the above-cited U.S. application Ser. No. 308,679. The battery is shown for convenience as having its negative input terminal connected to ground, and its positive terminal at a potential E that is positive with respect to ground.

In the illustrative system here shown, the battery 14 is assumed to be enclosed in a film pack that is connected to the rest of the apparatus when the film cassette is inserted in the camera. For that purpose, the terminals of the battery 14 are shown connected to the camera circuits over connectors schematically indicated at 15 and 16. The battery is connected to the strobe unit 5 over connectors indicated schematically at 17 and 18.

The exposure control system 12 may comprise any conventional means for responding to the operation of the pushbutton 4 by opening the shutter of the camera, and then momentarily closing a conventional spring-returned switch 19, as by a mechanical connection schematically indicated at 20, to briefly ground a lead 21 over the contacts of the switch 19, and thereby produce a trigger pulse comprising a ground level current sink. This pulse is supplied to the strobe unit through any suitable connector 22. When produced, the trigger pulse operates the strobe unit to produce an illuminating flash in a manner to be described below. Thereafter, the exposure control system 12 closes the shutter in a conventional manner, and thus terminates the exposure.

The film transport motor control system 13 may also be of any conventional variety, operable to provide drive current from the battery to a conventional DC motor 23. When operated, the motor 23 may advance the film, and, as in the Polaroid SX-70 Land Camera, may serve to eject an exposed film unit through spread rolls which cause the film unit to be processed and produce a finished print. For the purposes of this invention, the control system 13 may simply be a switch, connected in series with the battery and the windings of the motor 23, and closed when it is desired to operate the motor.

The exposure control system 12 typically requires relatively small currents, on the order of milliamperes, whereas the motor 23 draws larger currents, on the order of magnitude of an ampere. The strobe unit, next to be described, requires roughly an order of magnitude more total power than the other elements of the system. The current required by the strobe unit may not be substantially greater than that required by the motor; typically, a maximum of about 1½ amperes. However, this current must be drawn for a considerably longer time. For example, each exposure may require the motor 23 to operate for about a second, whereas the recharging of the strobe unit may require from 7 to 15 seconds.

When the system is assembled in the manner illustrated in FIG. 2, and the on-off switch 11 in the strobe unit 5 is closed, voltage is applied across the terminals of the winding of a conventional relay RK which is selected to pick up, and close its front contacts 24, at a predetermined value of voltage. As an example, it will be assumed that the nominal open circuit potential of the battery 14 is 6 volts. The pick-up voltage required for the relay RK may, for that application, be 5.0 volts. Once picked up, the relay RK requires less current to hold its contacts 24 closed. Thus, the relay will drop out at a lower voltage, which may be for example, 4.2 volts.

The relay RK may also be viewed as a current responsive device, because the voltage across its winding determines the current through the winding. The resistance of the winding should be relatively high so that the current drawn will be small. If desired, a resistor can be connected in series with the relay winding. In that case, the relay must be designed to pick up and release at lower levels of current and voltage.

It will be seen that when the on-off switch 11 is open, no current is drawn by the strobe unit 5. When the switch 11 is closed, and the battery potential E is at 5.0 volts or greater, the relay RK will be picked up to close its front contact 24. When both contacts 11 and 24 are closed, the strobe unit operates normally to charge until the ready lamp 10 is lit.

In order to obtain a suitable potential for operating the flash tube 7, a voltage converter is provided which comprises a pnp transistor Q1 and a transformer T1. The transformer T1 has a primary winding 25 that has one terminal connected to ground over the contacts 24 of the relay RK and the on-off switch 11, both in their closed positions. The other terminal of the winding 25 is connected to the collector of the transistor Q1. The emitter of the transistor Q1 is returned to the battery potential E.

The transformer T1 has a tapped secondary winding 26 comprising a high voltage section 27 and a low voltage section 28. The tap 29 at the junction of the sections 27 and 28 is connected to the base of the transistor Q1. The upper terminal of the secondary winding 26 is connected through a tuning capacitor C1 and a starting capacitor C2, in series, to the lower terminal of the winding 26.

When the switch 11 and the contacts 24 of the relay RK are both closed, a starting circuit is completed for the transistor Q1 that extends from ground over the closed contacts just described, and thence through a resistor R1 and through the capacitor C2 to the battery terminal at the potential E+. The charge thus developed on the capacitor C2, opposite the polarity shown, produces a voltage on the base of the transistor Q1, transmitted through the lower portion 28 of the secondary winding 26 and the tap 29, to forward bias the base of the emitter of the transistor with respect to the base, turning it on for purposes to appear.

The capacitor c1 is selected to tune the circuit comprising the capacitor C1, the capacitor C2 and secondary winding 26 to any convenient resonant frequency, such as 5 to 15 KHz.

The storage capacitor C3, of, for example, 300 microfarads rated at 300 volts DC, is connected in a charging circuit that extends from the upper terminal of the transformer secondary winding 26, through a diode D1, through the capacitor C3, and thence through the capacitor C2 back to the lower terminal of the winding 26. The capacitor C3 is charged by this circuit at times when the upper terminal of the transformer secondary winding 26 is more positive than the upper terminal of the capacitor C3. The capacitor C3 will be charged to a maximum potential level, for example, 300 volts. During the charging process, the capacitor C2 will assume a charge of the polarity indicated in FIG. 2, as will appear.

A ready light in the form of a gas discharge tube 10 is connected in series with a current limiting resistor R2 across the capcitor C3. When the capacitor C3 is charged sufficiently to operate the gas tube 7, the lamp 10 will discharge and glow, and be visible in the housing of the strobe unit 5 as an indication that the apparatus is ready for a flash exposure.

The discharge tube 7 may be of the conventional xenon filled type. The tube 7 comprises a cathode connected to the lower terminal of the capacitor C3, an anode connected to the upper terminal of the cathode C3, and a grid 30 returned to the terminal at the battery potential E+ through the secondary winding 31 of a pulse transformer T2. The primary winding 32 of the pulse transformer T2 is connected between the supply terminal at the potential E+ and one terminal of a capacitor C4. The other terminal of the capacitor C4 is returned to the cathode of the diode D1 through a current limiting resistor R3.

When the on-off switch 11 is closed and the relay RK is energized to close its front contacts 24, a starting pulse of current will flow through the resistor R1 to charge the capacitor C2 to a potential opposite the polarity shown. That will forward bias the transistor Q1, turning it on and allowing a pulse of current to flow through the primary winding 25 of the transformer T1. That will induce a high voltage pulse in the secondary winding 26 of the transformer T1, causing the tank 30, comprising the secondary winding 26 and the capacitors C1 and C2, to ring at the frequency determined by the selected value of the components. The tap 29 provides regenerative coupling to the transistor Q1 to produce sustained oscillation at the frequency determined by the frequency of the tank.

Each time the upper terminal of the secondary winding 26 goes positive with respect to the lower terminal by an amount exceeding the voltage across the capacitor C3, a charging pulse of current will flow to the capacitor C3 through the diode D1. At the same time, the capacitor C4 will be charged through the resistor R3 and the primary winding 32 of the pulse transformer T2. The positive half cycle of the voltage across the winding 26 will thus be clipped to the current amplitude of the voltage across the capacitor C3. During the negative half cycle, the full potential is reached. Thus, the capacitor C2 will be charged to a voltage of the polarity shown in the drawings, and having an amplitude that equals the difference between the positive maximum amplitude of the current through the secondary winding of the transformer T1 and the negative maximum amplitude. This potential may be, for example, about 2.5 volts, and has a polarity opposing conduction of the transistor Q1. Thus, at times when the upper winding of the primary 26 is positive with respect to the lower terminal, the transistor Q1 will be held off.

As the upper terminal of the winding 27 goes negative with respect to the lower terminal, the tap 29 goes negative with respect to the upper terminal of the capacitor C2, and a value will be reached at which the transistor Q1 will be turned on. It will remain turned on as the tap 29 goes negative, and until it is reached a value in a rising direction at which the transistor Q1 will again be cut off. This switching action will allow a pulse of current to flow through the primary winding 25 each cycle of the current through the secondary winding 26, and sustain the oscillation produced in the tank circuit.

As noted, the capacitor C4 will be charged with its upper terminal positive with respect to its lower terminal as the capacitor C3 is charged. When a ground lever trigger pulse is applied to the trigger input terminal at the junction of the resistor R3 and the capacitor C4, over the lead 21 and connector terminals 22 described above, the capacitor C4 will be abruptly discharged, causing a pulse of current to flow through the primary winding 32 and induce an oscillatory ringing pulse of, for example, 5,000 volts, across the secondary winding 31. That will excite the grid 30 of the tube 7 and allow the tube to discharge, producing a flash exposure.

When the flash occurs, the capacitor C3 will be discharged, and lamp 10 will be extinguished. The unit will resume charging, as before, as long as the switch 11 is closed and the relay RK remains energized.

When the battery potential E falls below the predetermined value of, for example, 4.5 volts, the relay RK will be de-energized to open the contacts 24, and the strobe unit 5 will no longer draw current until the battery has recovered to the preset potential of 5.0 volts. In the interval, ample power will be available to operate the exposure control system 12 and the film transport motor control system 13 to drive the motor 23. The operator will be made aware of the fact that his battery is low by the fact that the ready light 10 does not go on even though the switch 11 may be closed.

Figure 3:
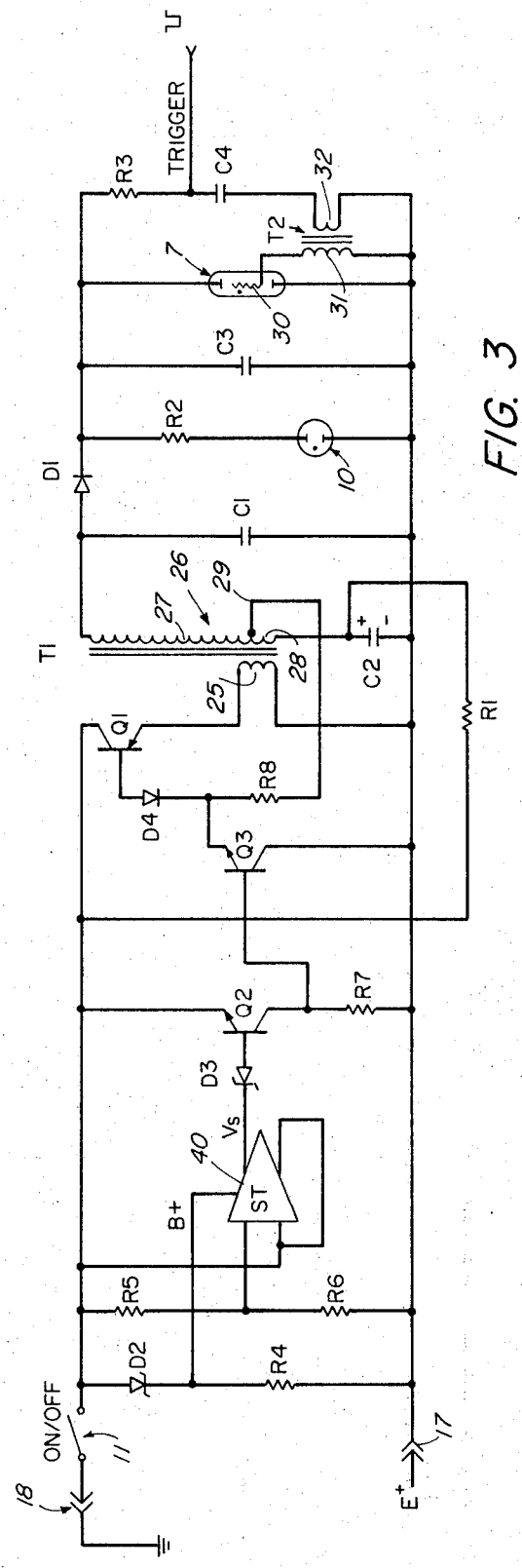
FIG. 3 is a schematic wiring diagram of a modified strobe circuit, and a control circuit therefor, in accordance with another embodiment of the invention.

FIG. 3 shows a modification of the strobe recycle control circuit in accordance with the invention, in which the relay RK in FIG. 2 is replaced by voltage detection circuit and a transistor switch. The construction and operation of the circuit is somewhat more complex, but may be preferred because it can be made primarily in integrated circuit form, and thus more compact. Further, it does not require movable contacts. It is also capable of being designed to require less standby operating current when the switch 11 is closed.

The elements of the voltage converter and the strobe triggering and charging circuit may be the same as those described above in connection with FIg. 2, similar parts being designated by similar reference characters. The voltage converter circuit is modified by moving the primary winding 25 of the transformer T1 into the emitter circuit of the transistor Q1, being connected between the emitter and the positive terminal at E+. The collector of the transistor Q1 is returned to ground over the switch 11, as shown.

A conventional Schmitt trigger circuit 40 is employed as the battery voltage detector in this embodiment of the invention. Since the Schmitt trigger circuit essentially measures the ratio of the input voltage to its own supply voltage, a constant supply voltage at a voltage B+ below E+ is provided by a voltage divider comprising a resistor R4 and a zener diode D2 connected in series across the input terminals. The diode D2 is selected to break down, and conduct current in the reverse direction, at a voltage below the minimum expected voltage E attained during the useful service life of the battery. For example, a 3.8 volt zener diode could be employed for this purpose. That will produce a battery potential B+ of 3.8 volts for the Schmitt trigger circuit 40, regardless of the excursions of the potential E above that value. An input signal for the Schmitt trigger 40 is derived by a potential divider comprising two resistors R5 and R6 connected between ground and the supply terminal at E+ when the switch 11 is closed. The Schmitt trigger 40 is designed to produce an output potential Vs that is low when the voltage at the junction of the resistors R5 and R6 is at or below a first potential, such as 2.5 volts, and is high when that voltage is at or above a second potential, such as 3.0 volts. These correspond, respectively, to a drop out voltage E1 for the battery potential E, as shown in FIG. 4, and a higher value E2 at which it is desired to allow the strobe circuit to begin recharging. The output signal from the Schmitt trigger 40 is applied to the cathode of a second zener diode D3 that has its anode connected to the base of an npn transistor Q2. The voltage VD3 at which the zener diode D3 breaks down is selected to be intermediate the high and low output values of the voltage Vs, such that the diode D3 will be switched into conduction when the voltage Vs goes high, and out of conduction when it goes low. The voltage VD3 should also be selected to be high enough so that the Schmitt trigger cannot produce a voltage high enough to break down the zener diode D3 if the potential E goes so low that the diode D2 does not break down, and the potential B+ thus goes below 3.8 volts.

The transistor Q2 has its collector returned to the supply terminal at the potential E+ through a resistor R7. The emitter of the transistor Q2 is returned to ground when the switch 11 is closed. The collector of the transistor Q2 is connected to the base of an npn transistor Q3. The collector of the transistor Q3 is connected to the supply terminal at B+.

The emitter of the transistor Q3 is connected to the cathode of a diode D4 that has its anode connected to the base of the transistor Q1. The tap 29 is connected to the emitter of the transistor Q3 and the cathode of the diode D4 through a current limiting resistor R8.

Assuming that the battery potential E+ is above the design point of, say, 5.0 volts, when the switch 11 is closed, the power supply potential at B+ will be applied to the Schmitt trigger 40 and the input terminal of the Schmitt trigger 40 will receive a potential high enough to cause the output terminal to go high, as indicated at FIG. 4. The diode D3 will break down, biasing the transistor Q2 into conduction so that its collector goes down near ground potential. That will cut off the transistor Q3. In that condition, the strobe unit will function essentially as described above. The closing of the switch 11 will cause a starting pulse of current to flow through the resistor R1, and charge the capacitor C2. That will bias the transistor Q1 into conduction over the circuit extending through the lower portion 28 of the secondary winding 26 of the transformer T1, the tap 29, through the resistor R8 and the diode D4. Because of the presence of the diode D4, an additional increment of voltage will be required to turn the transistor Q1, and this current must flow through the resistor R8. These additional requirements may be met by adding a few turns to the secondary portion 28 of the transformer T1, relative to the number required for the circuit of FIG. 2.

Once the oscillator comprising the transistor Q1, the transformer T1, and the capacitors C1 and C2 has started to oscillate, charging of the capacitor C3 will proceed as before until the ready lamp 10 is lit, whereupon the camera may be operated to produce a trigger pulse to operate the flash tube 7. The capacitor C3 will then be recharged until it is again triggered, so long as the battery voltage remains above the potential E1 at which the Schmitt trigger 40 will respond by producing a low signal Vs as indicated in FIG. 4.

When the output signal of the Schmitt trigger does go low, the zener diode D3 will no longer conduct, and the transistor Q2 will be turned off. That will raise the potential of its collector essentially to E+, gating the transistor Q3 into conduction and shutting off the transistor Q1. The additional gap required for the conduction of the diode D4 makes this shutting off operation more positive. The voltage converter can no longer oscillate, because the transistor Q1 cannot be turned on with the transistor Q3 turned on.

The resistor R8, together with the resistor R1, serves to greatly limit the collector current flowing in the transistor Q3 during the time when the circuit cannot be recharged. The small current required to maintain the Schmitt trigger in operation will be drawn, through the resistor R4 and also through the resistors R5 and R6. However, these currents may be quite small compared to the other drains for which the system is designed.

The battery will be allowed to recover until the voltage next rises to E2, at which time the Schmitt trigger 40 will again produce a high signal to turn on the transistor Q2, turn off the transistor Q3, and allow the transistor Q1 and transformer T1 to oscillate. It will be noted that no standby current is drawn by the strobe unit when the switch 11 is in its off position, as in the embodiment of FIG. 2.

While the invention has been described with respect to the details of various illustrative embodiments, many changes and variations will occur to those skilled in the art upon reading this description. Such can be obviously made without departing from the scope of the invention.

Having thus described the invention, what is claimed is:

1. In combination with a camera having an electronic flash unit and a film transport motor, a source of electrical energy having an output voltage that fluctuates with use, means operable to supply energy from said source to said motor, and switching means responsive to the voltage of said source for supplying energy from said source to said flash unit when said voltage is above a predetermined value, whereby the energy of said source is available for supply to said motor without diminution by said flash unit when said voltage is below said predetermined value.

2. The apparatus of claim 1, in which said switching means comprises a relay, and means for connecting said relay to said source.

3. The apparatus of claim 1, in which said switching means comprises trigger circuit means for producing a first signal when said voltage is above said predetermined value and a second signal when said voltage goes below said predetermined value by a predetermined amount, and means responsive to said first signal for supplying energy from said source to said flash unit.

4. The apparatus of claim 2, in which said relay comprises contacts connected between said source and said flash unit and a winding responsive to a first voltage to close said contacts and responsive to a second voltage lower than said first voltage for opening said contacts, and means for connecting said source to said winding.

5. A photographic system comprising a camera having a lens and shutter, a strobe unit, a shutter button for operating the shutter, a film transport motor requiring a first voltage for operation, a battery, and means for connecting said battery to said motor, said strobe unit comprising a storage capacitor, a ready light connected to said capacitor for producing a light signal when said capacitor is charged to a predetermined voltage, charging circuit means connected across said capacitor, and responsive to applied voltage at least equal to a second voltage to charge said capacitor to said pedetermined voltage, voltage sensing means responsive to an applied voltage to produce a first signal when the applied voltage reaches or exceeds a third voltage higher than said second voltage and to produce a second signal when the applied voltage falls below said second voltage, said second voltage being higher than said first voltage, manually operable switching means settable to first and second positions, means controlled by said manually operable switching means in its second position for connecting said battery to said voltage sensing means, and means controlled by said manually operable switching means and said voltage sensing means for supplying current from said battery to said charging circuit means when said manually operable switching means is in its second position and said first signal is present, whereby said light signal indicates that said strobe unit is in readiness for use and that said battery has sufficient residual capacity to operate said motor, and the absence of said light signal provides a low battery indication while said battery still has sufficient residual capacity to operate said motor.

6. The apparatus of claim 5 in which said voltage sensing means comprises a relay having a winding and contacts closed when said third voltage is applied to said winding, said contacts being opened when a voltage not greater than said second voltage is applied to said winding, means connecting said winding in series with said battery when said manually operable switching means is in its second position, and means including a path over said contacts when closed for supplying current from said battery to said charging circuit.

7. The apparatus of claim 5, in which said voltage sensing means comprises a Schmitt trigger circuit responsive to the voltage of said battery when said manually operable switching means is in its second position, said trigger circuit being switched to produce said first signal when the voltage of said battery rises to at least said third voltage, and said trigger circuit being switched to produce said second signal when the voltage of said battery falls at least to said second voltage.

8. The apparatus of claim 7, in which said charging circuit means comprises a transistor having an emitter, a collector and a base, a voltage step up transformer having a primary winding connected in series with the emitter and the collector of said transistor and a tuned secondary winding, rectifying means coupling said secondary winding and said capacitor, and regenerative coupling means between said secondary winding and the base of said transistor, said regenerative coupling means being controlled by said trigger circuit and responsive to said first signal to cause oscillation in said secondary winding, said second signal being effective to quench oscillation in said secondary winding by biasing said transistor against conduction.

9. A preferential power distribution system for a camera having a plurality of power consuming devices including a strobe unit, said strobe unit being operable in response to an applied voltage above a first value and the other of said devices being operable in response to an applied voltage above a second value below said first value, said system comprising, at least a pair of supply terminals adapted for connection to a common electrical power supply subject to voltage variations in use, means for connecting said terminals to said other devices, and means responsive to voltage across said terminals for operatively connecting said terminals to said strobe unit when the voltage across said terminals rises to a third value higher than said first value and for effectively disconnecting said terminals from said strobe unit when the voltage across said terminals falls below said first value.

10. The apparatus of claim 9, in which said strobe unit comprises indicating means for producing a visible signal when said strobe unit is operable, whereby the absence of said visible signal indicates a voltage across said terminals below said first value while the voltage across said terminals is still sufficient to operate said other devices.

11. The apparatus of claim 9, in which said means responsive to the voltage across said terminals comprises a relay having a winding and contacts closed when the voltage across said winding rises to a value determined by said third value, said contacts being opened when the voltage across said windings falls below a value determined by said first value and lower than the voltage at which said contacts are closed, means for connecting said winding to said terminals, and means connecting said contacts in series between said terminals and said strobe unit.

12. The apparatus of claim 11, in which said strobe unit comprises indicating means for producing a visible signal when said strobe unit is operable, whereby the presence of said visible signal indicates a voltage across said terminals adequate to operate all of said power consuming devices, and the absence of said visual signal indicates a voltage across said terminals inadequate to operate all of said power consuming devices while the voltage is still adequate to operate said other power consuming devices.

13. The apparatus of claim 9, in which said means responsive to the voltage across said terminals comprises a voltage sensing trigger circuit switched to produce a first signal in response to an applied voltage equal to or greater than a value proportional to said third value and switched to produce a second signal in response to an applied voltage equal to or less than a value in the same proportion to said first value, and means responsive to said trigger circuit for operatively connecting or effectively disconnecting said terminals to said strobe unit according as said first or said second signal is produced, respectively.

14. The apparatus of claim 13, in which said strobe unit comprises indicating means for producing a visible signal when said strobe unit is operable, whereby the presence of said visible signal indicates a voltage across said terminals adequate to operate all of said power consuming devices, and the absence of said visual signal indicates a voltage across said terminals inadequate to operate all of said power consuming devices while the voltage is still adequate to operate said other power consuming devices.

15. A photographic system comprising a camera having a film transport motor, a battery, and an electronic flash unit, comprising means for supplying current to said motor from said battery, and means for sensing the voltage of said battery, means controlled by said sensing means for operatively connecting said battery to said flash unit when said battery voltage is above a first value and effectively disconnecting said battery from said flash unit when said battery voltage is below a second value lower than said first value.

* * * * *